United States Patent

Deneky

[15] 3,638,735
[45] Feb. 1, 1972

[54] ROCK PICKUP MACHINE

[72] Inventor: Nick Deneky, General Delivery, Stirling, Alberta, Canada

[22] Filed: Nov. 26, 1969

[21] Appl. No.: 880,098

[52] U.S. Cl. .................................................171/63, 171/101
[51] Int. Cl. .................................................A01b 43/00
[58] Field of Search....................171/63, 101, 92, 129, 116, 171/64, 112

[56] References Cited

UNITED STATES PATENTS 1,541,533   6/1925   Smith.......................................171/101
2,732,672   1/1956   Fleischman..............................171/63
3,151,682   10/1964  Bussiere....................................171/63

*Primary Examiner*—Antonio F. Guida
*Attorney*—Kent & Ade

[57] ABSTRACT

A pickup reel has tracks and rollers which position pickup fingers as the reel is rotated. A step formed in the track causes the fingers to shake during rotation thus clearing same and the fingers are resiliently hinged to clear immovable objects they might encounter.

21 Claims, 6 Drawing Figures

INVENTOR.
NICK DEWECKY
BY
AGENTS

ROCK PICKUP MACHINE

This invention relates to mobile material pickup machines, and more particularly to a tractor-drawn and operated machine for picking up surface stones or rocks from agricultural fields and other ground.

An important object of the invention is the provision of a hopper-equipped machine of the kind indicated which involves a driven reel which deposits stones into the hopper, and a rock pickup assembly which precedes the reel, and which serves to pick up loose surface rocks, and from which the reel carries picked up rocks to the hopper in a continuous operation.

A more important object of the invention is the provision in a machine of the character indicated above, of a rock pickup assembly which is arranged not only to move automatically and harmlessly out of the way when it encounters embedded rock, but to also move the reel harmlessly out of the way when the pickup assembly is thus displaced, so that damage to the tines of the reel and ground gouging by these tines which would otherwise occur is eliminated.

It is an object of the invention to have a rotating cross rod preceding the grate of the pickup assembly so that it will be self-cleaning.

It is an object of the invention that the pickup reel can be used with or without the rock pickup assembly.

A further object of the invention is the provision of a machine of the character indicated above, which because of the damage eliminating features mentioned above, is adapted to be constructed of lighter gauge, lighter weight materials, and hence less expensively than other heavier machines, and to be drawn over the ground and operated with correspondingly less power.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying figures in which:

In the drawings like characters of reference indicate corresponding parts in the different figures.

Figure 1:
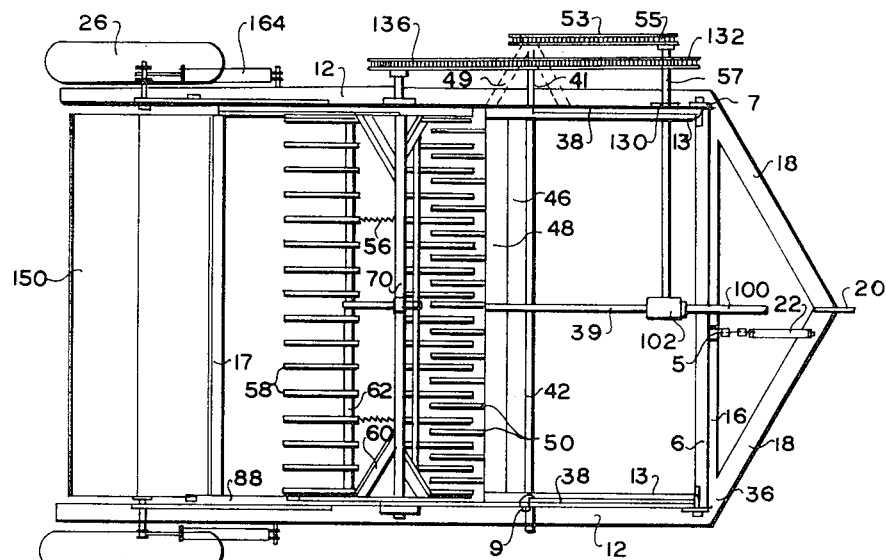
FIG. 1 is a top plan view of the invention partly broken away.

Referring in detail to the drawings, the illustrated machine comprises a rectangular frame having parallel spaced longitudinal side members 12, a front crossmember 16, and a rear crossmember 17. Fixed to the ends of the front crossmember 16 are laterally inwardly and forwardly extending members 18, which meet to form a support for a tractor hitch 20 (FIG. 1).

Wheel brackets 24 extend downwardly from the side frame members 12, and carry ground engaging wheels 56.

A rock pickup assembly generally designated 34, comprises brackets 36 attached to front crossmember 16, rearwardly and downwardly extending shanks 38 are pivoted to brackets 36, adjacent to the inner sides of the side members 12, and a single such shank 39 is attached to the bracket 36 in the middle of crossmember 16. The forwardly extending shoes 44, attached to the shanks 38 and 39 have a rotary cross rod 42 extending through them.

Figure 2:
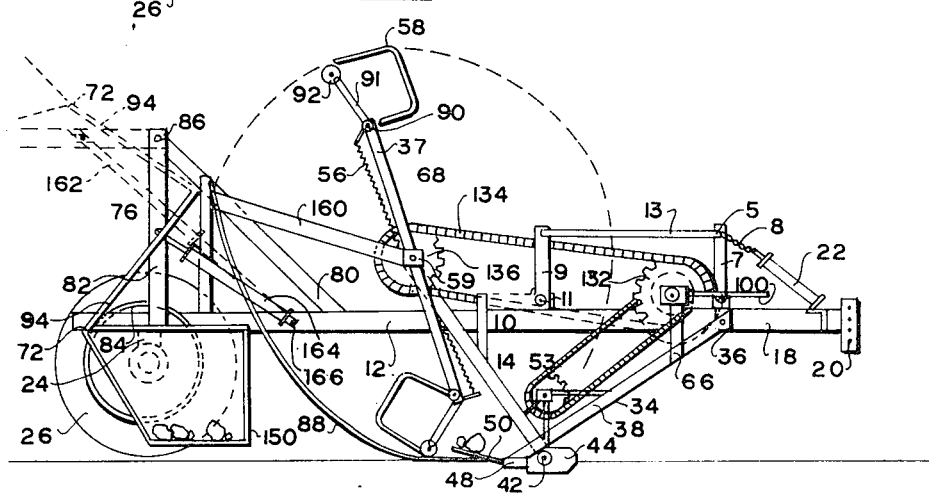
FIG. 2 is a side elevation of FIG. 1, partly broken away, showing the rock pickup assembly in operation position, and the reel in operative position; and the hopper in depressed normal position in full lines and in dumping position in phantom lines.

As shown in FIG. 2 the shoes 44 and the cross rod 42 are adapted to engage in the ground G just below the prevailing surface thereof, so as to lift loose rocks therefrom as the machine is moved forwardly, and to deposit these rocks onto a grate generally designated 46. The spacing of the grate bars 50 allows the soil and debris to fall through while the rocks of a desired size are retained.

Figure 3:
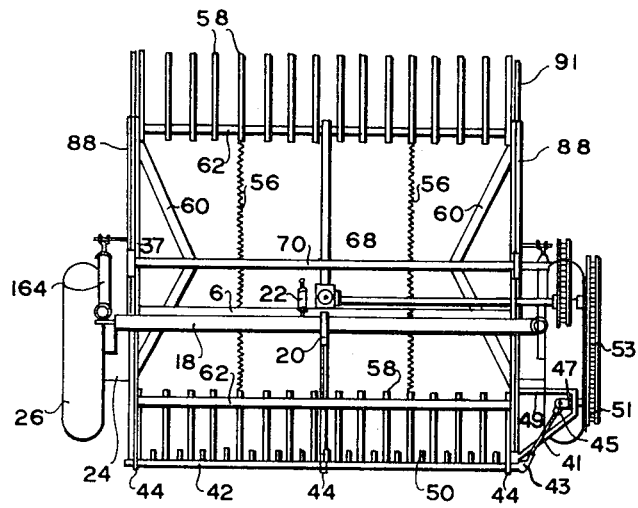
FIG. 3 is a front end elevation FIG. 1.

For rotating the cross rod 42, in order to prevent the accumulation of debris thereon, a drive is provided which comprises a shaft 41, which is flexibly connected at 43 to the rod 42, and at 45 to a shaft 47 (FIG. 3). The shaft 47 is journaled on an outrigger bracket 49 fixed to a shank 38 and to the grate 48 and has a sprocket wheel 51 over which a chain 53 is trained.

The chain 53 is also trained over a sprocket wheel 55 on a shaft 57 which is journaled through a bearing 130 on the adjacent shank 38 (FIG. 1). The tractor power takeoff is attached to drive shaft 100, and by means of gearbox 102 the shaft 57 is rotated and this in turn rotates the cross rod 42 in a counter clockwise direction as seen in FIG. 2.

The grate 46 comprises a transverse shaft 48 which is attached to shanks 38 and 39 behind the cross rod 42. Parallel spaced rearwardly extending rods 50 are fixed to and spaced along the flat-iron shaft 48. Passage of cross rod 42 and the grate 46 over an embedded rock produces harmless elevation of the pickup assembly 34. Fixed to the lower ends of the shanks 38 are supports 14 which support the reel, one at each end thereof. As the pickup assembly is lifted by embedded rock the reel and all its components are also elevated harmlessly out of the reach of these rocks.

For elevating the shanks 38 and 39 and hence the grate 46 and the reel 68 above the ground at will, a hydraulic cylinder 22 is pivoted to a member 18 and to a vertical arm 5 which is fixed to a transverse shaft 6. The transverse shaft 6 has at either end fixed upright arms 7. The cylinder 22 is attached to arm 5 by means of a short chain 8, this allows the arm 7 to move ahead at will if the need be, but will not allow the arms to move backward past a desired point. An L-shaped swivel 9 is flexibly connected to bracket 11 fixed to a side frame member 12, one to each side. A connecting link 13 is flexibly connected to arms 7 and to the L-shaped swivel 9, and another connecting link 10 flexibly attaches swivel 9 to reel support 14 one at either side of the machine immediately inside the frame side members 12. This arrangement enables the tractor driver to clear the working components of the machine from the ground and it also ensures that the pickup assembly always remains parallel to the frame; as both sides must move up or down equally with this lifting device.

Figure 5:
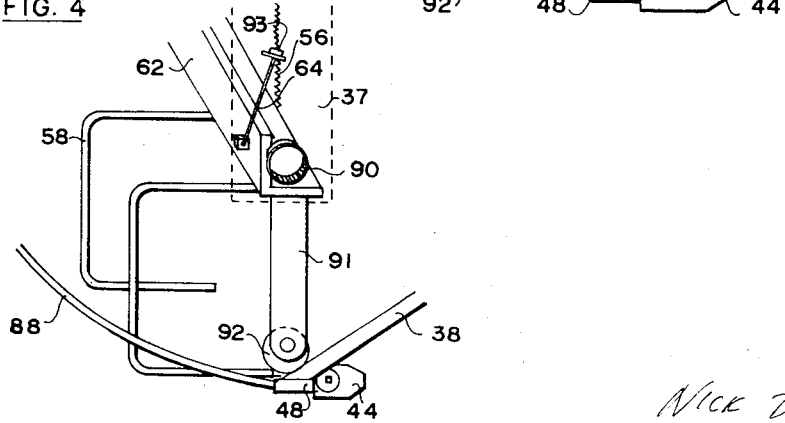
FIG. 5 is an enlarged detailed view illustrating the mounting of the tines on the reel, and the stop and the spring which controls these tines.

The reel generally designated 68 comprises a transverse reel shaft 70 which is journaled through its upright supports 14 at a substantial distance behind the pickup assembly 34, the shaft 70 having thereon fixed arms 37 and braces 60. Crossmembers 62, usually of angle iron are attached at each end thereof to arms 37 in a manner enabling them to pivot on bearings 90 (FIG. 5). Springs 56 are attached to cross shifts 62 and serve to keep the tine assemblies 58 against stops 93 (FIG. 5). The tine assemblies 58 which are attached to crossmembers 62 in parallel and equally spaced fashion reach spacedly into the spaces between adjacent ones of the pickup assembly grate bars 50, adjacent to the rear ends of the latter. Tines 58 are secured to said crossmembers and are substantially basket shaped as illustrated.

Figure 4:
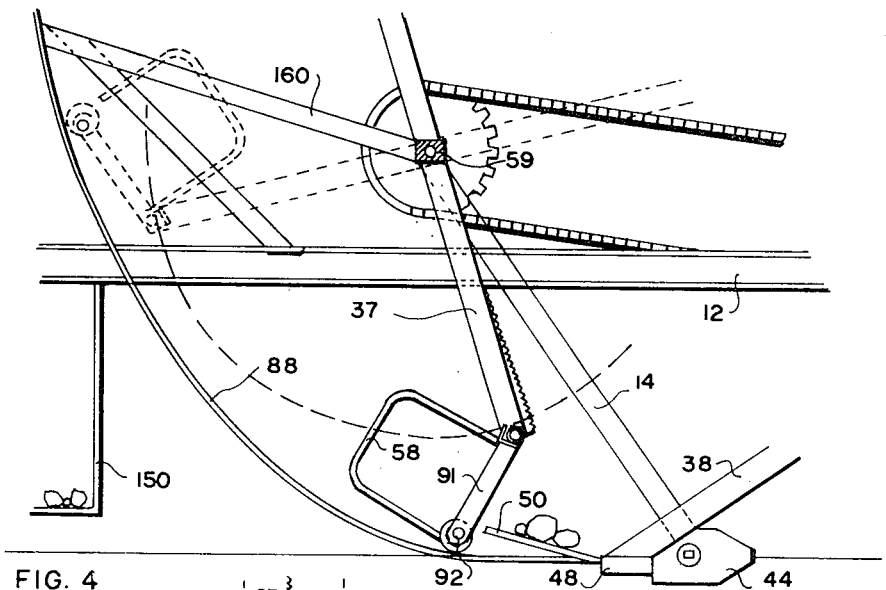
FIG. 4 is a fragmentary vertical section of FIG. 2 showing the purpose of the track as it guides the tines past the hopper after said tines have dumped their load of rocks.

Tracks 88 are attached to the grate 46 and to supports 14 at bearing housing 59 by a brace 160. The tracks 88 one at each side of the reel serve to retract tines 58 as they pass the hopper by means of rollers 92 on ends of arms 91 attached to crossmember 62 (FIG. 4). The tines are released to their picking position as they near the grate 46.

Continuous rotation of the reel is produced by a geared drive assembly consisting of a gearbox 102 fixed upon plate 66 attached to shank 39 of the pickup assembly and contains a forwardly extending shaft 100 adapted to be connected to a power takeoff shaft of a tractor connected to the hitch 20. The box 102 also contains a transverse power shaft 57 which is journaled through a bearing 130 fixed upon the end shank 38. The shaft 57 has thereon, outside the adjacent frame side member 12 a sprocket wheel 132 over which is trained a rearwardly extending sprocket chain 134. The chain 134 is trained at its rear end over a sprocket wheel 136 on the outwardly end of the reel shaft 70 which is journaled through a bearing in housing 59 on upright supports 14 attached to shaft 38. With this arrangement, the components being properly proportioned, operation of the drive assembly rotates the reel continuously.

The hopper 150 is rectangular shape and is suspended from the machine frame extensions 80 by vertical bars 82 having pivots as shown at 84 and 86 (FIG. 2). Hydraulic cylinders 164 are pivoted at their lower ends as indicated at 166 to the frame side members 12, and the upstanding piston rods 162 are pivoted to the vertical bars 82 (FIG. 2). A connecting rod 94, pivoted at 72 and 79 tips and dumps the hopper at its elevated position. The cylinders 164 are suitably connected to the hydraulic system of the tractor, whereby the tractor driver can at will dump the hopper 150 into which the tines of the reel dump rocks.

Figure 6:
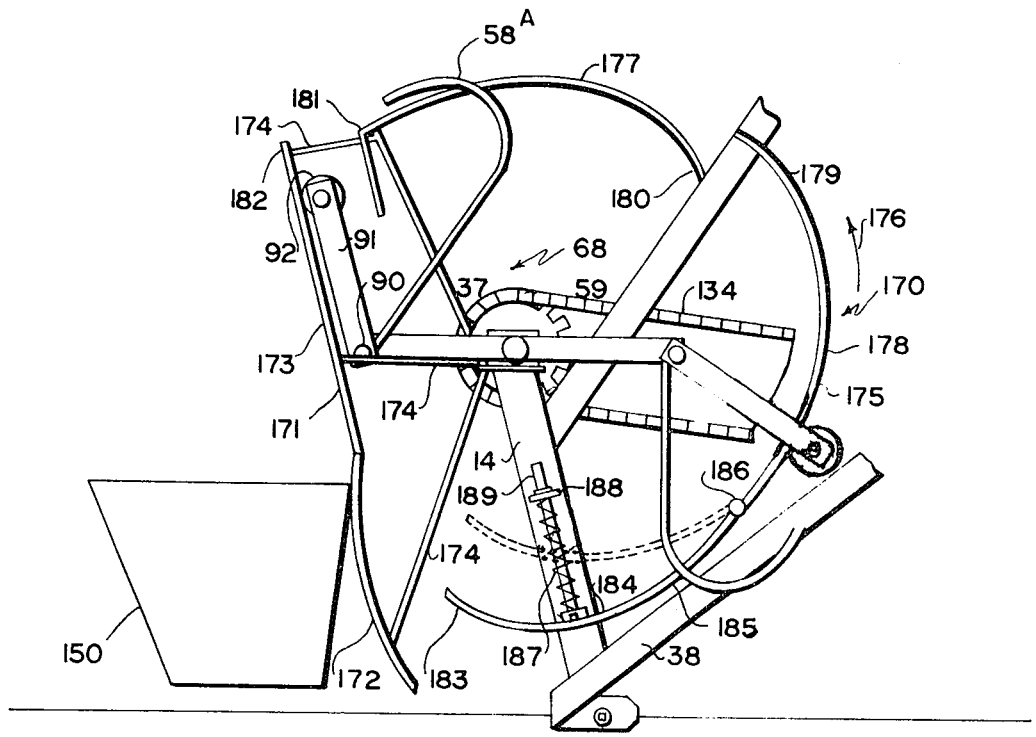
FIG. 6 is a fragmentary enlarged side elevation of the preferred track assembly and is a modification of the track assembly shown in FIGS. 1 to 5.

FIG. 6 is a modification of the structure previously described and where applicable, similar reference characters have been given the structure. The reel assembly 68 is mounted within bearings 59 upon the upper ends of arms 14 which in turn are pivotally connected for raising and lowering as hereinbefore described.

The track assembly collectively designated 170 consists of a tine-retracting portion 171 which includes a partially arcuately curved lower end 172 and an upwardly and rearwardly inclined upper portion 173 and being situated adjacent the hopper 150. Braces 174 mount these tracks as illustrated.

The remainder of the track is identified as a guiding portion 175 and extends substantially around the remainder of the path traversed by the tine assemblies 58' during their movement in direction of arrow 176 as hereinbefore described.

This guiding portion includes an upper segment 177 and a side segment or front segment 178 and it should be observed that the trailing end 179 of the front segment 178 is stepped above the leading end 180 of the upper segment 177 so that as the antifriction rollers 92, which engage the outer surfaces of these portions, passes from the end 179 to the end 180, there is a distinct drop thus acting as a shaker mechanism to clear soil from the tines.

As the roller 92 reaches the trailing end 181 of the upper section, the rollers engage the inner surface of the leading end 182 of the track portion 173 thus retracting the tine assemblies until it reaches the lower end of the portion 172 whereupon it engages the leading edge 183 of a hinged track portion 184. This portion 184 constitutes the lower track portion and is hinged by the and 185 to the leading end 186 of the aforementioned front or side portion 175.

A compression spring 187 is connected by one end thereof to the inner surface of the lower portion 184 and this spring reacts against a stop 188 normally biasing the hinged portion downwardly to the limits of the spring-mounted rod 189. If the tine assemblies strike an obstruction when at the lowermost or rock picking position, they can retract due to the pivotal mounting thereof and at the same time force the portion of the track 184 upwardly against pressure of spring 187 thus preventing damage from occurring.

As the tine assemblies pass this lower portion 184 or the obstruction is cleared, the spring 187 biases the track portion 184 downwardly into the operative position once again.

The more or less continuous track gives accurate control and eliminates the necessity of springs 56 illustrated and described in the previous embodiment.

I have found that under certain conditions, I can eliminate the rock pickup assembly, relying entirely on the rotating reel to scoop stones from the surface of the ground and to deposit same in the dumpbox. This is accomplished by the specific design of the reel, particularly the reel shown in FIG. 6 and some of the claims attached hereto cover this particular concept.

Various modifications can be made within the scope of the inventive concept which is herein disclosed and/or claimed.

What is claimed to be the present invention is:

1. A rock picker comprising in combination a wheel supported framework, a rock pickup assembly depending from said framework and extending transversely across said framework, a reel mounted for rotation above said framework and rearwardly of said rock pickup assembly, and a hopper in said framework situated to the rear of said reel, said reel including a mounting shaft, a plurality of tine supporting arms extending from adjacent the ends of said shaft, tine assemblies mounted between the ends of said arms transversely across said reel, means to rotate said reel, means to retract said tines as said tines pass through the segment of a circle adjacent said hopper, and means interconnecting said rock pickup assembly and said reel whereby the raising and lowering of said rock pickup assembly causes corresponding raising and lowering of said reel, said means to retract said tines including a pair of arcuately curved tracks operatively connected to said rock pickup assembly and said reel and antifriction means on the end of each of said tine assembly engaging said tracks and pivoting said tine assemblies into the retracted position.

2. The device according to claim 1 in which said pickup assembly includes a plurality of spaced and parallel shanks pivotally secured by one end thereof to said framework and extending downwardly and rearwardly therefrom, ground engaging shoes on the other ends of said shanks, transverse ground engageable rotatable rod extending through said shoes, a transverse grate extending between said other ends of said shanks, and a plurality of spaced and parallel grate rods extending rearwardly from said grate.

3. The device according to claim 2 in which said means interconnecting said reel with said rock pickup assembly includes a pair of reel supports secured by one end thereof to said rock pickup assembly, said reel shaft being journaled for rotation in the other ends of said supports, and linkage means extending between said supports and said framework, said linkage means including adjustable power means for actuating said linkage and loose link component between said power means and said linkage to permit raising and lowering of said interconnected reel and rock pickup assembly independently of said power means.

4. The device according to claim 3 in which said tine assemblies include a plurality of spaced and parallel basket shaped tines pivotally secured to said tine support arms, said tines passing between said grate bars and being positioned to lift rocks and stones from said grate bars as they pass therebetween.

5. The device according to claim 3 in which said tine assemblies include crossbars extending between the end of said arms and being journaled for partial rotation within said ends, a plurality of spaced and parallel tines secured to said crossbars, spring means extending between said tines and said arms normally maintaining said tines in the extended position and stops on said arms engageable by said tines limiting said extending position of said tines.

6. The device according to claim 5 in which said tines pass between said grate bars and are positioned to lift rocks and stones from said grate bars as said tines pass therebetween.

7. The device according to claim 2 in which said tine assemblies include a plurality of spaced and parallel basket-shaped tines pivotally secured to said tine support arms, said tines passing between said grate bars and being positioned to lift rocks and stones from said grate bars as they pass therebetween.

8. The device according to claim 2 in which said tine assemblies include crossbars extending between the ends of said arms and being journaled for partial rotation within said ends, a plurality of spaced and parallel tines secured to said crossbars, spring means extending between said tines and said arms normally maintaining said tines in the extended position and stops on said arms engageable by said tines limiting said extending position of said tines.

9. The device according to claim 8 in which said tines pass between said grate bars and are positioned to lift rocks and stones from said grate bars as said tines pass therebetween.

10. The device according to claim 1 in which said tine assemblies include crossbars extending between the ends of said arms and being journaled for partial rotation within said ends, a plurality of spaced and parallel tines secured to said crossbars, spring means extending between said tines and said arms normally maintaining said tines in the extended position and stops on said arms engageable by said tines limiting said extending position of said tines.

11. The device according to claim 10 in which said tines pass between said grate bars and are positioned to lift rocks and stones from said grate bars as said tines pass therebetween.

12. The rock picker according to claim 1 in which said arcuately curved tracks include a tine-retraction portion adjacent said hopper and a guiding portion extending substantially through the remainder of the path followed by said tine assemblies, said major portion including a hinged, spring-loaded segment adjacent the lower side thereof whereby said tine assembly moves upwardly if an obstruction is engaged thereby.

13. The rock picker according to claim 12 which includes a stepped portion in said track acting as a shaker mechanism.

14. The rock picker according to claim 13 in which said hinged, spring-loaded segment includes a curved track portion hinged by one end thereof to the remainder of said major portion and adapted to swing upwardly relative thereto, and a compression spring reacting between said hinged segment and said framework normally biassing said segment downwardly within limits, said antifriction means on the ends of each tine assembly engaging said arcuately curved tracks on the inner surface thereof and said guiding portion upon the outer surface thereof.

15. The rock picker according to claim 12 in which said hinged, spring-loaded segment includes a curved track portion hinged by one end thereof to the remainder of said major portion and adapted to swing upwardly relative thereto, and a compression spring reacting between said hinged segment and said framework normally biassing said segment downwardly within limits, said antifriction means on the ends of each tine assembly engaging said arcuately curved tracks on the inner surface thereof and said guiding portion upon the outer surface thereof.

16. In a rock picker which includes a reel-supported framework, and a hopper in said framework, a reel mounted for rotation above said framework, said reel including a mounting shaft, a plurality of tine supporting arms extending from adjacent the ends of said shaft, tine assemblies mounted between the ends of said arms transversely across said reel, means to rotate said reel, and means to retract said tines as said tines pass through the segment of the circle adjacent said hopper, said last-mentioned means including a pair of arcuately curved tracks supported in said framework and antifriction means on the end of each of said tine assemblies engaging said tracks and pivoting said tine assemblies into the retracted position, said arcuately curved tracks including a tine retraction portion adjacent said hopper and a guiding portion extending substantially through the remainder of the path followed by said tine assemblies, said major portion including a hinged, spring-loaded segment adjacent the lower side thereof whereby said tine assembly moves upwardly if an obstruction is engaged thereby.

17. The device according to claim 16 in which said tine assemblies include a plurality of spaced and parallel basket-shaped tines pivotally secured to said tines support arms.

18. The device according to claim 16 in which said tine assemblies include crossbars extending between the ends of said arms and being journaled for partial rotation within said ends, a plurality of spaced and parallel tines secured to said crossbars, spring means extending between said tines and said arms normally maintaining said tines in the extended position and stops on said arms engageable by said tines limiting said extended position of said tines.

19. The device according to claim 16 which includes a stepped portion insert track acting as a shaker mechanism.

20. The according to claim 19 in which said hinged, spring-loaded segment includes a curved track portion hinged by one end thereof to the remainder of said major portion and adapted to swing upwardly relative thereto, and a compression spring reacting between said hinged segment and said framework normally biassing said segment downwardly within limits, said antifriction means on the ends of each tine assembly engaging said arcuately curved tracks on the inner surface thereof and said guiding portion upon the outer surface thereof.

21. The device according to claim 16 which said hinged, spring-loaded segment includes a curved track portion hinged by one end thereof to the remainder of said major portion and adapted to swing upwardly relative thereto, and a compression spring reacting between said hinged segment and said framework normally biassing said segment downwardly within limits, said antifriction means on the ends of each tine assembly engaging said arcuately curved tracks on the inner surface thereof and said guiding portion upon the outer surface thereof.

* * * * *